United States Patent [19]

Mansur

[11] Patent Number: 5,603,380
[45] Date of Patent: Feb. 18, 1997

[54] ROW FOLLOWING SYSTEM FOR A ROW CULTIVATOR

[76] Inventor: Peter L. Mansur, "Florida North", Moree, New South Wales, 2400, Australia

[21] Appl. No.: 361,053

[22] Filed: Dec. 21, 1994

[30] Foreign Application Priority Data

Dec. 22, 1993 [AU] Australia .................... PM3104

[51] Int. Cl.⁶ .................................... A01B 69/00
[52] U.S. Cl. .................... 172/26; 172/271; 172/776
[58] Field of Search .................... 172/5, 26, 233, 172/271, 261, 776; 111/18

[56] References Cited

U.S. PATENT DOCUMENTS

| | | |
|---|---|---|
| 3,512,587 | 5/1970 | Shader . |
| 4,184,551 | 1/1980 | Orthman ............................... 172/26 |
| 4,228,860 | 10/1980 | Orthman ............................... 172/26 |
| 4,463,811 | 8/1984 | Winter ................................... 172/26 |
| 4,655,295 | 4/1987 | Barnes et al. ........................ 172/26 |
| 5,094,300 | 3/1992 | Jurgena ................................. 172/5 |

*Primary Examiner*—Terry Lee Melius
*Assistant Examiner*—Victor Batson
*Attorney, Agent, or Firm*—Fitzpatrick, Cella, Harper & Scinto

[57] ABSTRACT

A row cultivator (10) includes a row following system (12) coupled to a toolbar (13) employing frame members (17) and (18) constrained to remain parallel by a cross member (21). Coulter wheels (30) and (31) secured to the frame members (17) and (18) are non-steerable and tool bar drift may be corrected. A tool (40) employs a leading blade (44) and a pair of diverging cutting blades (47) and (48) trailing behind the leading blade (44). A sheer release assembly employs a longitudinally extending bolt (70) centrally disposed and holding a shank (61) to a tool bar (65) so that when a tool on the shank (61) strikes an underground obstacle the bolt (70) is sheared longitudinally.

13 Claims, 3 Drawing Sheets

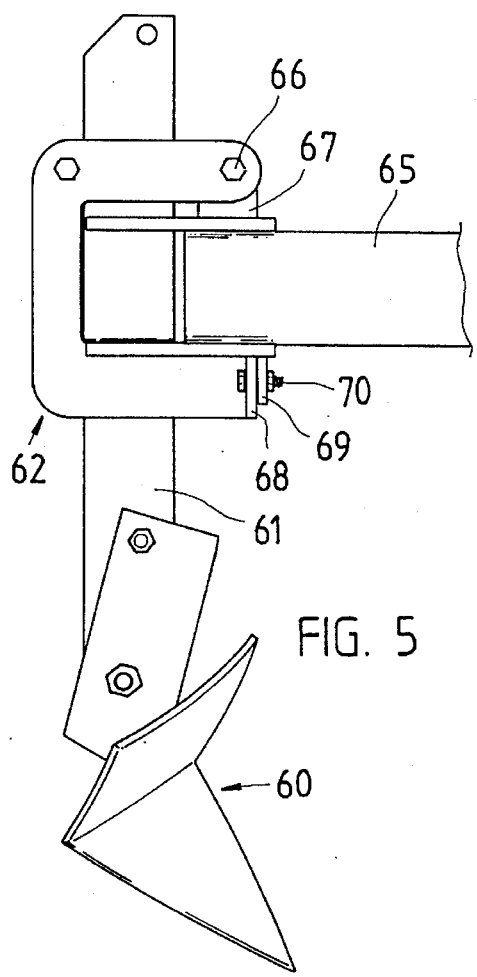
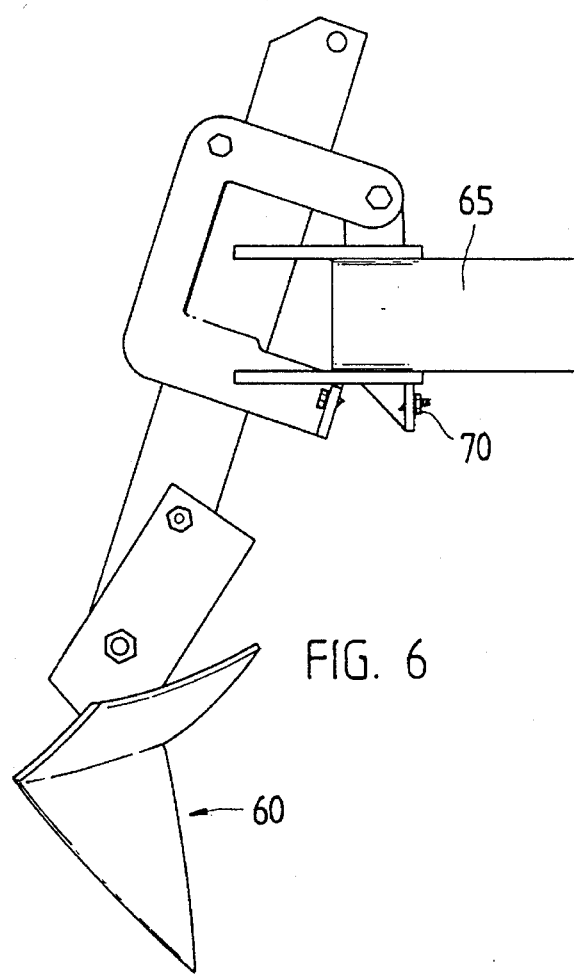
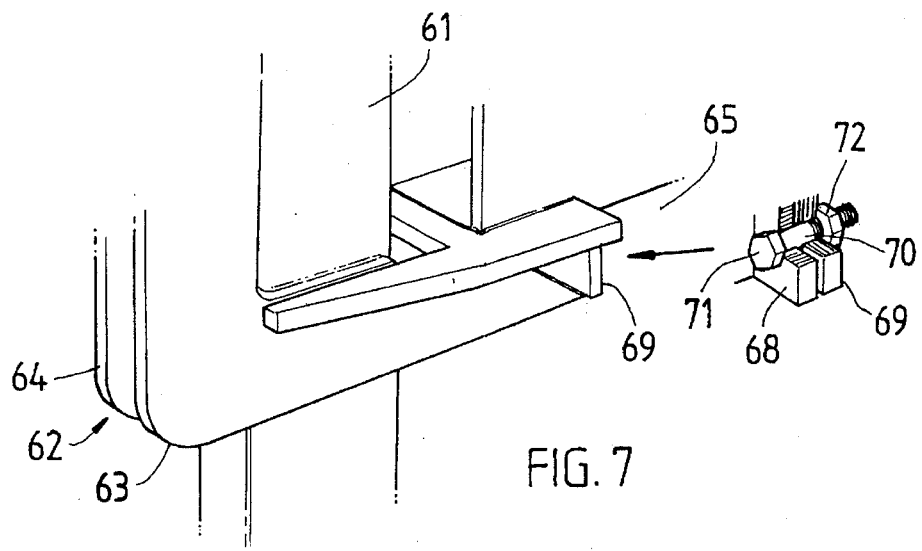

ROW FOLLOWING SYSTEM FOR A ROW CULTIVATOR

This invention relates to improvements in or in relation to row cultivators.

At present, row cultivators suffer from a number of disadvantages.

One disadvantage arises where a large number of rows are being worked and a guidance system is employed to account for tool bar drift. At present, guidance systems employ probes which track the crop or the bottom of the furrow between adjacent rows. Coulter wheels on the guidance system are steered in response to detected deviation of the probe and forward travel is required to obtain a correction. Therefore, existing guidance systems have a slow response time and it would be desirable to provide an improved guidance system with improved response time.

Another disadvantage arises where cutter blades are employed behind a tool. Typical tooling for cultivating row crops consist of five vertical shank assemblies per row of crop with a tool comprising either "L" shaped knives or a single disc attached to the end of the shank. Each tool's position can be independently adjusted vertically and horizontally.

The main problems with this type of arrangement are (i) the difficulty in adjusting the shank assemblies; and (ii) the narrow knives or discs allow weeds to bend around the tooling if the weed is not struck "dead-centre".

The present cutter blade arrangements are inefficient.

A further disadvantage arises with present shear release arrangements for shear release of shanks. At present under existing shear release arrangements where a tool strikes an underground obstacle such as a rock or root, a horizontally extending transverse bolt is sheared and the shank swings backward about a transversely extending horizontal pivot. After this happens, repair is a very time consuming process because when the bolt is sheared, it does not shear cleanly and removal of the bolt is difficult resulting in a long period of down time for the cultivator.

The applicant has devised a number of improvements which alleviate the above problems and although the improvements can be used independently, it is preferable to use the improvements in combination for the overall benefit they provide.

In one aspect therefore, the present invention is directed to a now following system for a row cultivator of the type employing a transverse tool bar carrying cultivating tools behind a prime mover, the now following system being responsive to transverse deviation of the tool bar from a desired position and being operative to return the tool bar to the desired position, the improvement comprising a pair of parallel spaced frame members trailing behind and pivotally coupled to the tool bar at transversally spaced apart locations to pivot in concert about spaced vertical axes, a cross member bridging between the frame members and having opposite ends pivotally coupled to the frame members to pivot about vertical pivot axes, a coulter wheel attached to each frame member, each coulter wheel rotating about a fixed horizontal axis and there being provided frame member drive means adapted to push the frame members relative to the cross member whenever the tool bar drifts from a desired position so that the tool bar position is thereby corrected. The coulter wheels are preferably fixed and parallel to the frame members.

The spaced frame members can be any form. Each frame member preferably includes respective dog leg sections behind the respective vertical pivot connections to the cross member, the dog leg sections positioning the coulter wheels outside the frame members, the frame members having projecting end portions projecting back behind the cross member and the drive means comprising respective double acting hydraulic cylinder assemblies bridging between opposite ends of the cross member and the respective projecting end portions of the frame members.

In another aspect, the present application is directed to a tool for a row cultivator, the tool having a shank fitted with a leading blade for working soil, the leading blade being followed by a pair of cutting blades adapted to travel just below soil level to sever weeds on either side of the leading blade, the cutting blades having respective leading edges diverging rearwardly and outwardly on opposite sides of the leading blade.

The tool preferably includes a blade carrier unit secured to the shank, the carrier unit having a forward leading blade attachment means and a rearward cutting blade attachment means, the rearward cutting blade attachment means preferably comprising a pair of spaced vertical plates receiving a cutting blade carrier unit in the form of an inverted generally T-shaped plate.

Each cutting blade is preferably tapered, having a broad forward cutting edge portion located behind and inside the periphery of the leading blade.

Each cutting blade preferably has a forward portion located within the shadow of the leading blade.

In a further aspect, the present application provides a shear release assembly for a shank of a row cultivator being of the type employing a shank having a lower end carrying a tool travelling forward in soil and an upper end, the upper end being pivotally connected to a tool bar and being secured against pivot by the shear release assembly, the shear release assembly comprising a shear fastener holding the shank against pivot by applying a fastening force disposed in the direction of travel of said shank and at right angles to the shank pivot axis so that when the shank encounters an underground obstacle, the fastening force is overcome to shear the fastener and release the shank.

The shank is typically held in a clamping frame having spaced frame members coupled to the pivot, the clamping frame having a forward portion located below the pivot, the forward portion holding the shear fastener so that the forward portion separates from the support frame to release the shank when the tool encounters an underground obstacle.

The fastener is preferably centrally disposed relative to the clamping frame so that the fastener is centrally located on a central plane through which maximum force is applied.

In order that the present improvements can be more readily understood and be put into practical effect, reference will now be made to the accompanying drawings and wherein:

FIGS. 2 and 3 are respective plan and side views of a preferred tool employing a leading blade and cutting blades according to the present improvements; and FIGS. 3, 4, 5, 6, and 7 are side and cut away part views illustrating operation of a shear release assembly according to a preferred form of the present improvements.

Figure 1:
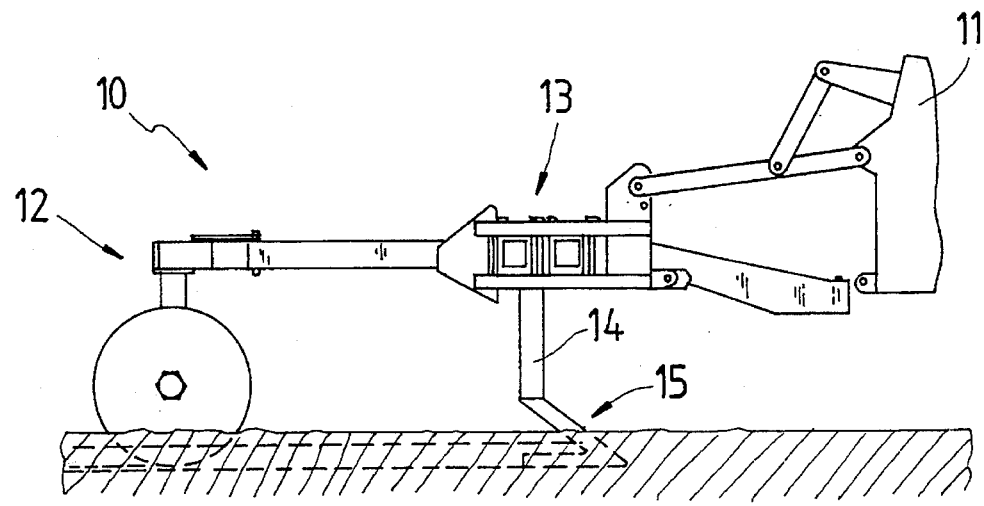
FIG. 1 is a side view of a row cultivator employing a row following system according to the present improvements.
Figure 2:
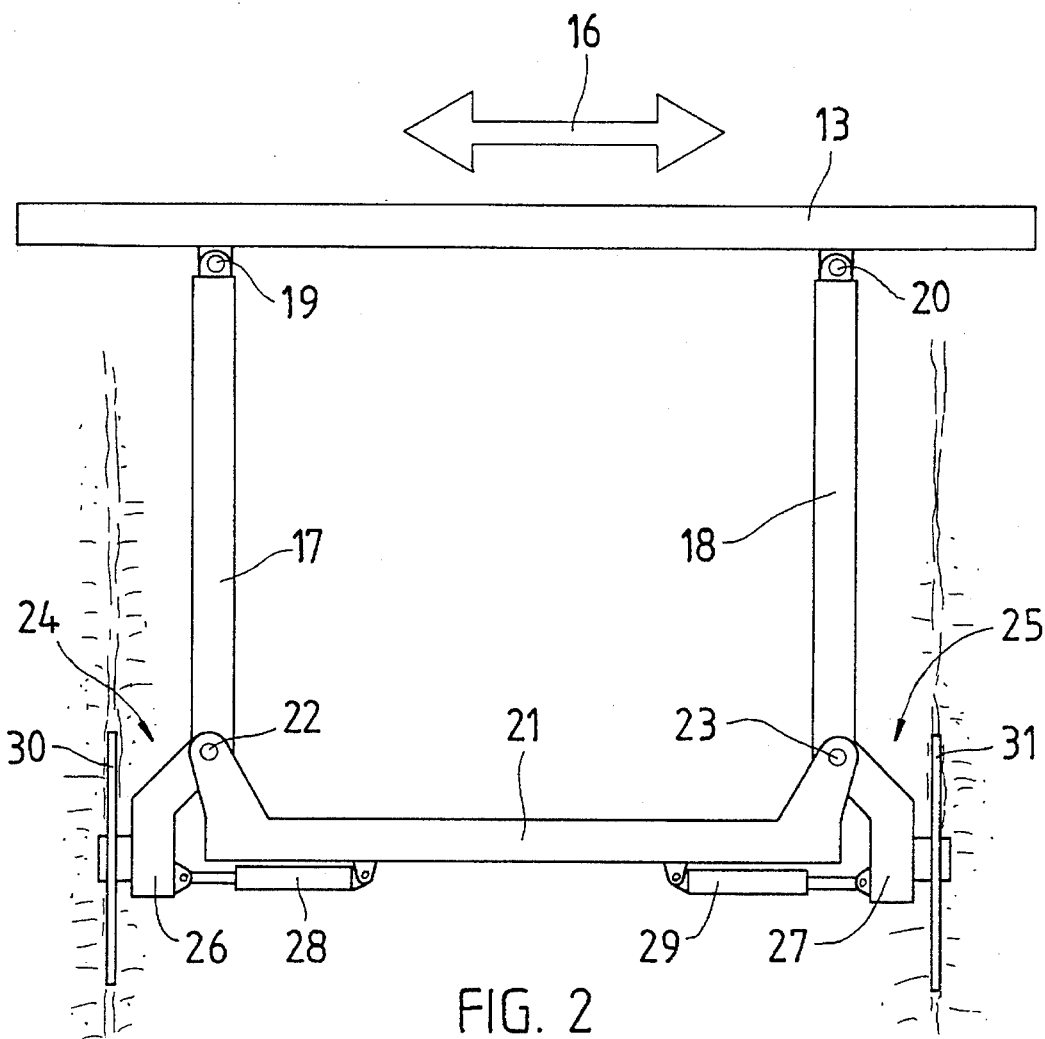
FIG. 2 is schematic plan view illustrating the operation of a typical row following system according to the present improvements.

Referring to the drawings and initially to FIGS. 1 and 2, there is illustrated a row cultivator 10 articulated to the rear of a prime mover 11 and employing a row following system 12 coupled to a tool bar 13. The tool bar 13 has shanks 14 carrying tools 15. As the cultivator moves forward, the tool bar 13 is prone to drift right or left as indicated by the arrows 16 in FIG. 2. In order to correct this drift, sensors are used to feel the crop or the bottom of the furrow behind the tool bar and any deviation from the desired position is corrected by the row following system.

In order to correct the position of the tool bar 13, the present invention employs a pair of frame members 17 and 18 which are secured to the tool bar via vertical pivots 19 and 20. The frame members 17 and 18 are constrained to remain parallel by a cross member 21 which is pivotally coupled to the frame members 17 and 18 at vertical pivots 22 and 23.

Each of the frame members 17 and 18 include dog leg sections 24 and 25 so that ends 26 and 27 of the frame members 17 and 18 project behind the cross member 21 in order to support respective hydraulic cylinder assemblies 28 and 29. Coulter wheels 30 and 31 are non steerable and in this regard are fixed to rotate about an axis set at 90° to the longitudinal axis of the frame members 17 and 18.

It will be appreciated, that whenever the cylinder assemblies 28 and 29 are actuated to push the end portion 26 and pull the end portion 27 or vice-versa, then because the coulter wheels 30 and 31 are anchored in the soil, the parallel frame members will bring about a repositioning of the tool bar 13 as the cultivator moves forward.

It will be appreciated that the present invention provides an immediate response with the force delivered by the hydraulic cylinder assemblies 28 and 29 being delivered directly to the tool bar through the frame members 17 and 18.

Figure 3:
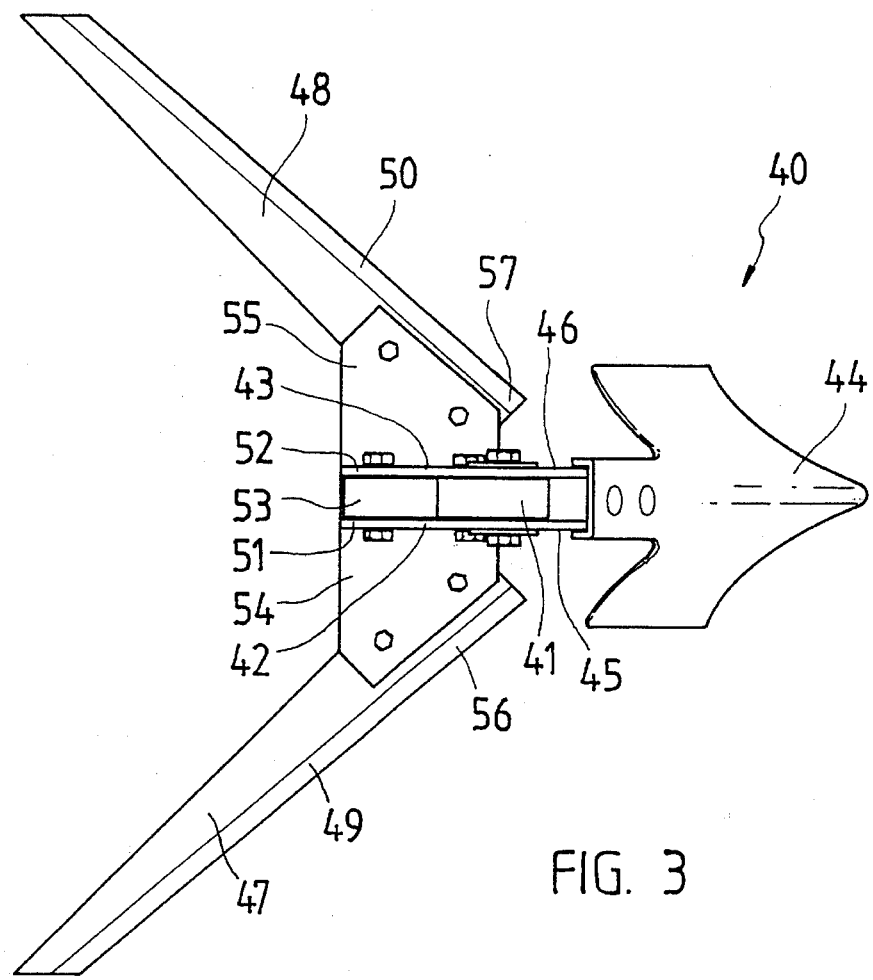
Figure 4:
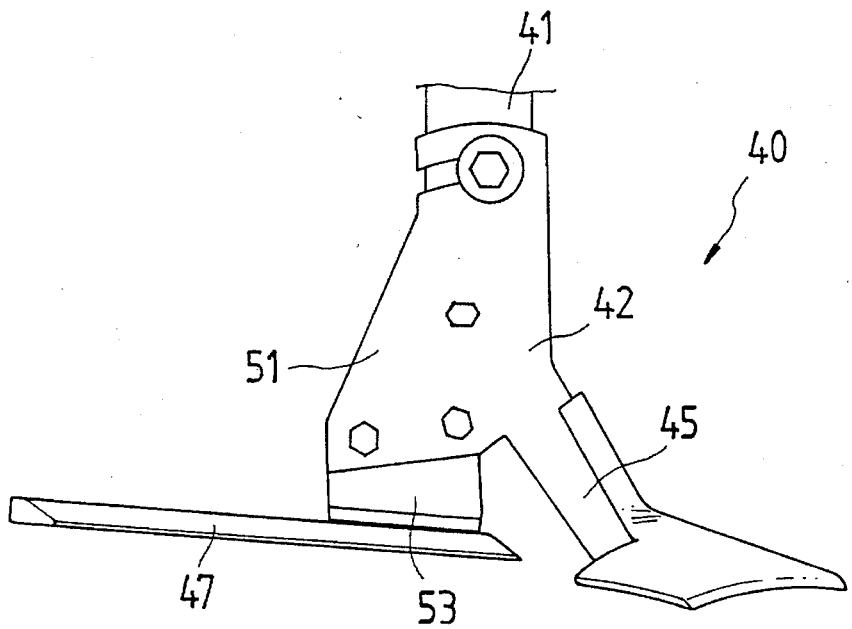

Referring now to FIGS. 3 and 4, there is illustrated a tool 40 for a row cultivator, the tool being secured to a shank 41 (similar to the shank 14 illustrated in FIG. 1) by a pair of plates 42 and 43 with the tool having a leading blade. In this case, the leading blade is a conventional sweep 44 which is mounted on a sweep attachment portion comprising plate section 45 and 46 of the plates 42 and 43. The sweep 44 is followed by respective blades 47 and 48 which have cutting edges 49 and 50 extending rearwardly and outwardly behind the sweep 44. The blades 47 are adapted to travel just below soil level in order to sever roots outside the sweep 44.

The plates 42 and 43 are pivotally mounted on the shank so that the inclination of the blades can be adjusted or the plates 42 and 43 can be adjusted to suit different leading blades. For example an "Alabama" or other blade can be used as the leading blade.

The plates 42 and 43 include rearwardly extending ear sections 51 and 52 receiving an upright portion 53 of a T-shaped plate which include wing sections 54 and 55 which hold the blades 47 and 48.

Blades 47 and 48 include leading edge portions 56 and 57 disposed within the periphery of the sweep 44.

The blades and sweep can be tilted as desired.

Referring now to FIGS. 5 to 7, there is illustrated a tool and shank arrangement using a shear release assembly according to the present improvement.

As can be seen in FIG. 5, there is illustrated a tool 60 disposed on the lower end of a shank 61 (similar to the shank 14 of FIG. 1 ). The shank being retained in a clamp 62 employing U-shaped clamp plates 63 and 64, the clamp being coupled to a tool bar 65 about a horizontal pivot axis 66 on flange 67. The C-shaped clamp plate 63 includes a flange 68 which abuts against a flange 69 extending down from the tool bar 65. A fastener in the form of a bolt 70 passes through holes in the flanges 68 and 69 and secures the plate 63 to the tool bar 65, the bolt being centrally disposed relative to the plates 63 and 64.

As soon as the tool 60 strikes an underground object, the bolt 70 fails as illustrated in FIG. 6. Most usually, the bolt 70 will fail by the head 71 breaking off or the nut 72 striping the thread.

It will be appreciated that by having the fastener in the form of a bolt 70, that the fastening force holding the shank in place, extends in the direction of travel of the tool and when the fastener 70 fails, the fastener 70 is easily removed with only a short period of time is involved. A new fastener can be put in place, and the shank returned to the position illustrated in FIG. 5.

Whilst the above has been given by way of illustrative example of the present invention, many variations and modifications thereto will be apparent to those skilled in the art without departing from the broad ambit and scope of the invention as herein set forth in the appended claims.

The claims defining the invention are as follows:

1. A row following system for a row cultivator of the type employing a transverse tool bar carrying cultivating tools behind a prime mower, the row following system being adapted to inhibit deviation of the tool bar from a desired position, the row following system comprising means for biasing the tool bar to the desired position, the improvement comprising a pair of parallel spaced frame members trailing behind and pivotally coupled to the tool bar at transversely spaced apart locations to pivot in concert about spaced vertical axes, a cross member bridging between the frame members and having opposite ends pivotally coupled to the frame members to pivot about respective vertical pivot axes, a coulter wheel attached to each frame member, each coulter wheel rotating about a fixed horizontal axis and providing anchors relative to which the tool bar can be moved and there being provided frame member drive means biasing the tool bar to the desired position by being adapted to push the frame members relative to the cross member against the coulter wheels whenever the tool bar drifts from the desired position so that the tool bar position is thereby corrected.

2. A row following system according to claim 1 wherein each frame member includes respective laterally displaced rear sections behind the respective vertical pivot axes of the cross member, the rear sections positioning the coulter wheels outside the frame members, the rear sections projecting back behind the cross member and the drive means comprising respective double acting hydraulic cylinder assemblies bridging between opposite ends of the cross member and the respective projecting rear sections of the frame members.

3. A row cultivator comprising a transverse tool bar carrying cultivating tools behind a prime mover and a row following system adapted to inhibit deviation of the tool bar from a desired position, the row following system comprising means for biasing the tool bar to the desired position, the row following system comprising a pair of parallel spaced longitudinal frame members trailing behind and pivotally coupled to the tool bar at transversely spaced apart locations to pivot in concert about spaced vertical axes, a cross member bridging between the frame members and having opposite ends pivotally coupled to the respective frame members to pivot about respective rearwardly disposed vertical pivot axes, a coulter wheel coupled to each frame member, each coulter wheel rotating about a fixed horizontal axis and providing anchors relative to which the tool bar can be moved and there being provided frame member drive means biasing the tool bar to the desired position by being adapted to push the frame members relative to the cross member against the coulter wheels whenever the tool bar drifts from the desired position so that the tool bar position is thereby corrected.

4. A row cultivator according to claim 3 wherein a plurality of shanks extend down from the tool bar, each shank having an upper end and a lower end carrying a tool travelling forward in soil, the upper end having a pivot and being pivotally connected to the tool bar and being secured against pivot by a shear release assembly, the shear release assembly comprising a shear fastener holding the shank against pivot by applying a fastening force disposed in the direction of forward travel of said shank and at right angles to a shank pivot axis so that when the tool on the shank encounters an underground obstacle, the fastening force is overcome to shear the fastener and release the shank.

5. A row cultivator according to claim 3 wherein each tool comprises a leading blade and respective cutting blades following in the wake of the leading blade and travelling just below the soil to sever weeds on either side of the leading blade, the cutting blades having respective leading edges diverging rearwardly and outwardly on respective opposite sides of the leading blade.

6. A row cultivator according to claim 4 or claim 5 wherein each coulter wheel is arranged to travel along a line spaced outward of and parallel to the longitudinal direction of the frame member to which it is coupled.

7. A row cultivator according to claim 4 or claim 5 wherein each frame member includes a respective rear end section displaced outwardly of the longitudinal line of a front end section of each of said frame members, a respective said coulter wheel being coupled to each said rear end section, and said drive means bridging between the cross member and each said rear end section respectively.

8. A row cultivator according to claim 5 wherein the tools are carried on respective shanks extending down from the tool bar, each shank having an upper end and a lower end carrying a tool, the upper end being pivotally coupled to the tool bar and being secured against pivot about a shank pivot axis by a shear release assembly, the shear release assembly comprising a shear fastener holding the shank against pivot by applying a fastening force disposed in the direction of forward travel of said shank and at right angles to the shank pivot axis so that when the tool on the shank encounters an underground obstacle, the fastening force is overcome to shear the fasteners and release the shank.

9. A row cultivator according to claim 3 wherein each coulter wheel is arranged to travel along a line spaced outboard of and parallel to the longitudinal direction of the frame member to which it is coupled.

10. A row cultivator according to claim 4 wherein the shank is secured to the tool bar by a clamping frame secured to a support member by the shear fastener the clamping frame having spaced members coupled to the pivot, the clamping frame having a forward portion located directly below the pivot, the forward portion being held by the shear fastener so that upon failure of the shear fastener the forward portion separates from the support member to release the shank.

11. A row cultivator according to claim 10 wherein the fastener is centrally disposed relative to the clamping frame so that the fastener is centrally located on a central plane through which maximum force is applied when the tool encounters an obstacle.

12. A row cultivator according to claim 5, wherein the tool includes a blade carrier unit, the carrier unit having forwardly projecting leading blade attachment means holding the leading blade and a rearwardly disposed cutting blade attachment means comprising a pair of bilaterally projecting wings, each wing holding one of said cutting blades.

13. A row cultivator according to claim 12 wherein the carrier unit includes means for changing the inclination of the blades.

* * * * *